J. W. SMITH.
COMBINED SCOOP AND SIFTER FOR FLOUR AND MEAL.
APPLICATION FILED APR. 28, 1914.

1,149,094.

Patented Aug. 3, 1915.
2 SHEETS—SHEET 1.

Inventor
John W. Smith.

J. W. SMITH.
COMBINED SCOOP AND SIFTER FOR FLOUR AND MEAL.
APPLICATION FILED APR. 28, 1914.
1,149,094.
Patented Aug. 3, 1915.
2 SHEETS—SHEET 2.
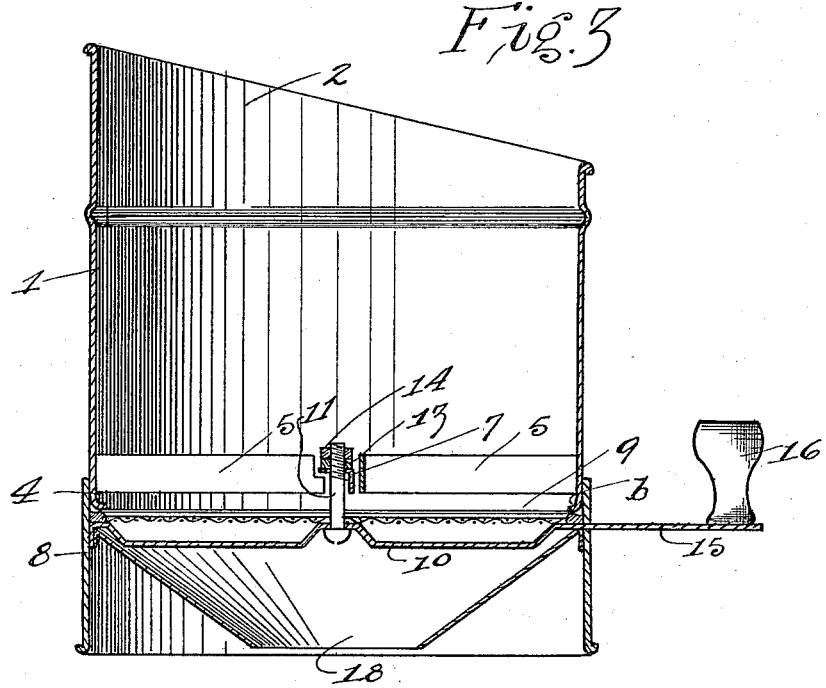
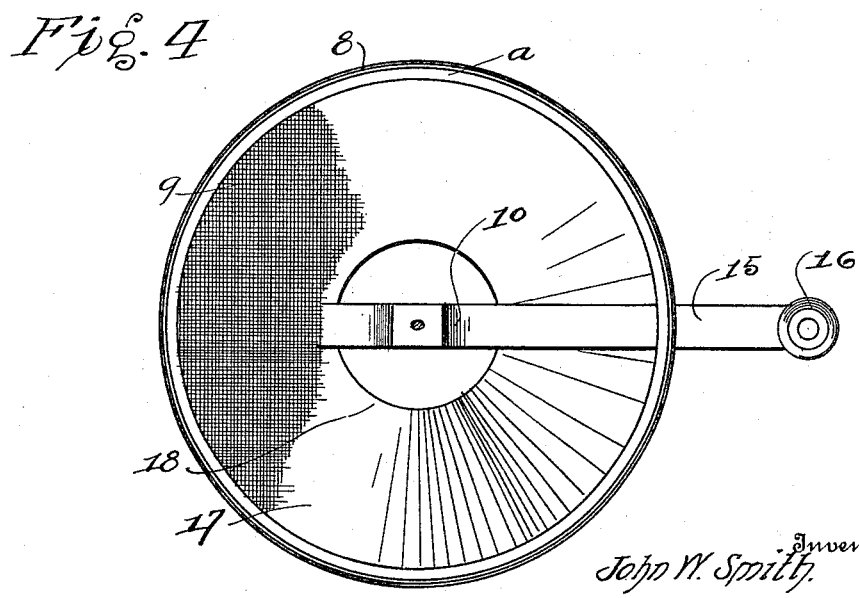

UNITED STATES PATENT OFFICE.

JOHN W. SMITH, OF SPOKANE, WASHINGTON.

COMBINED SCOOP AND SIFTER FOR FLOUR AND MEAL.

1,149,094. Specification of Letters Patent. Patented Aug. 3, 1915.

Application filed April 28, 1914. Serial No. 835,015.

*To all whom it may concern:*

Be it known that I, JOHN W. SMITH, a citizen of the United States, residing at Spokane, in the county of Spokane and State of Washington, have invented certain new and useful Improvements in Combined Scoops and Sifters for Flour and Meal; and I do hereby declare the following to be a full, clear, and exact description of the invention, such as will enable others skilled in the art to which it appertains to make and use the same.

This invention relates to combined scoops and sifters for flour and meal, and one of the principal objects of the invention is to provide a device of simple construction which will not grind up dirt and refuse matter with the meal or flour and pass it through the sieve.

The combined scoops and sifters in common use are provided with rotary scrapers which pass over in contact with the upper surface of the sieve to work the flour or the meal through the sieve. These scrapers will grind up the grit and dirt in the flour or meal and sift it through to be used in the cooked product.

This invention has for one of its objects the elimination of the defect above referred to, and to provide sweeps or rakes against which the flour or meal is thrown in sifting the same, said sweeps or rakes being located some distance from the face of the sieve, so that dirt, grit, flies, or other refuse matter will not be ground up and worked through the sifter.

Another object of the invention is to provide a combined scoop and sifter for flour and meal which shall be provided with a funnel for the discharge of the sifted material, thus, providing means whereby the flour or meal may be properly sifted and discharged into a small vessel, like a cup if a small quantity of the material only is required.

Still another object of the invention is to provide a device of the character described which shall be economical in use, cleanly and sanitary, and which can be manufactured and sold at a comparatively low figure.

These and other objects may be attained by means of the construction illustrated in the accompanying drawings, in which—

Figure 1:
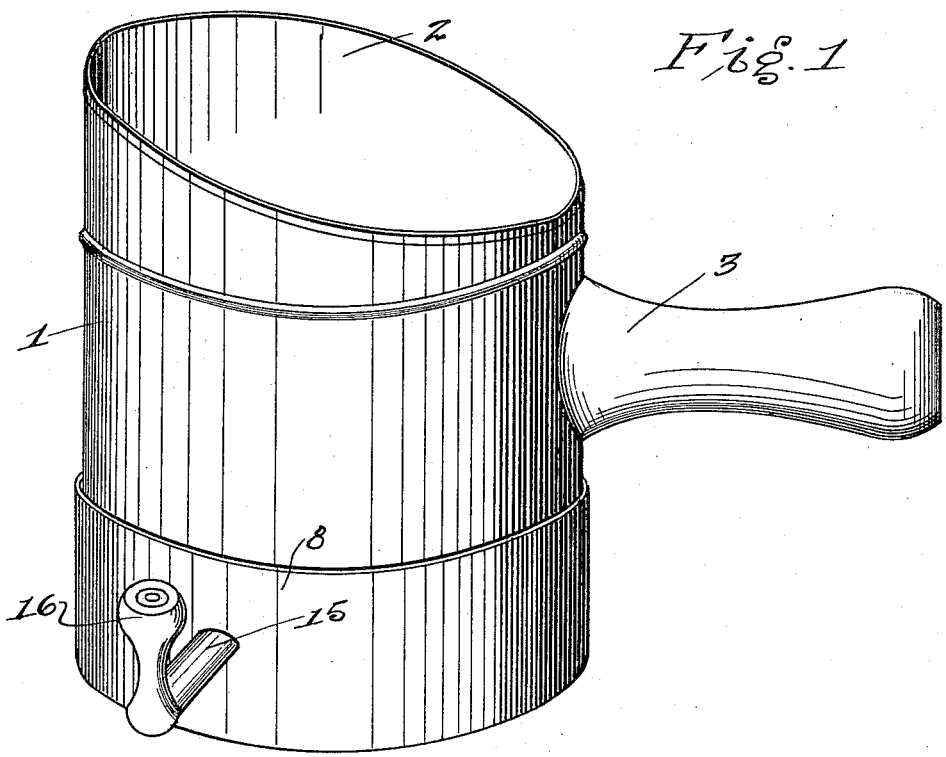
Figure 2:
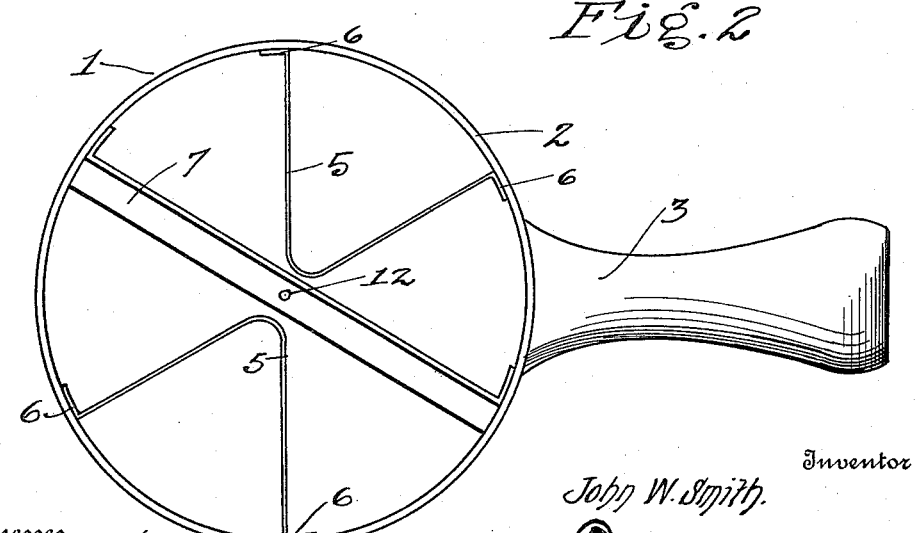

Figure 1 is a perspective view of a combined scoop and sifter made in accordance with this invention, Fig. 2 is a top plan view of the scoop with the sifter removed, and showing the arrangement of the sweeps or rakes and the cross bar for supporting the sifter, Fig. 3 is a vertical section through the combined scoop and sifter and discharge funnel, and Fig. 4 is a top plan view of the sifter removed from the scoop.

Referring to the drawings, the numeral 1 designates the scoop and container for the flour or meal to be sifted, said scoop being preferably formed of tin or other sheet material of circular form and having its upper edge 2 inclined as shown in the drawings. A handle 3 is connected in any suitable manner to the scoop. The lower edge of the member 1 may be provided with a binding wire 4 and the lower edge may be turned inwardly as shown more clearly in Fig. 3 around the binding wire 4 which gives strength and stability to the scoop and prevents the floor from working up between the bottom of the scoop and the top of the ring in which the sieve is mounted.

Connected within the scoop near its lower edge are V-shaped sweeps or rakes 5, and the outer ends of the rakes or sweeps are secured to the inner wall of the scoop in any suitable manner at 6.

A cross bar 7 preferably of angular form in cross section forms part of the sweeps or rakes and extends between the inner ends of the rakes or sweeps 5 and is secured at its ends within the scoop in any suitable manner.

The sifter is rotatably mounted upon the lower end of the scoop, and comprises a ring or sleeve 8 within which the lower end of the scoop is fitted rotatably.

Fitted near the upper edge of the ring 8 is a wire gauze screen 9 of any required mesh.

For preventing the lower edge of the scoop from wearing the outer edge of the screen 9, a rim is provided to protect the screen, and the lower edge of the scoop rides on said rim.

Extending across underneath the screen 9 is a cross bar 10, and to secure the screen to the scoop, a bolt 11 extends through the cross bar 10 and through the cross bar 7, said bolt being provided with a nut 13 and a lock nut 14.

A handle 15 for rotating the sifter is provided with a pivoted knob 16, and said handle may be formed as a continuation of the cross bar 10 if desired.

Mounted in the ring 8 below the cross bar 10 is a discharge funnel 17, having a restricted discharge opening 18.

It is to be noted that the lower edges of the V-shaped sweeps or rakes 5 are located at some distance from the upper face of the sieve 9, so that grit, dirt and foreign matter in the flour or meal will not be ground up on the sieve and forced through the same, and this feature also serves to extend the life and utility of the utensil owing to the fact that the rakes or sweeps 5 do not bear upon the face of the sieve to wear it away as is common in the devices of this kind in present use. The funnel 17 provides convenient means whereby the flour or meal may be discharged into a small vessel like a cup, when a small quantity only is desired.

The manner of using the device will be apparent without an extended description. The flour or meal may be scooped up, and by moving the handle 15 back and forth, the flour or meal is thoroughly sifted, while the refuse matter is held upon the outer surface of the sieve and the clean sifted flour or meal is discharged through the opening 18. The handle 15 may be turned entirely around and can be operated by either hand.

From the foregoing it will be obvious that the device is simple, durable and efficient for its purpose, and has many points of advantage over the structures now in common use. The device may be mounted in a kitchen flour cabinet for hotels or bakeries.

Various changes may be made in the details of construction without departing from the spirit and scope of the invention as defined in the claims.

What is claimed is:—

1. A combined scoop and sifter comprising a container, sweeps extending inwardly near the lower edges of said container, a sifter mounted at the lower end outside said container having a screen mounted therein at some distance below the lower edges of the sweeps to prevent forcing grit through the screen, a handle connected to said sifter for rotating the same relatively to the container.

2. A combined scoop and sifter comprising a container having sweeps extending inwardly near the lower edges thereof, a ring mounted to rotate on said container, said ring having a sieve mounted therein near the upper edge thereof spaced from the lower edges of said sweeps, a handle for rotating said ring relatively to said container, and a discharge funnel secured inside the ring below said sieve.

In testimony whereof I affix my signature in presence of two witnesses.

JOHN W. SMITH.

Witnesses:
Mrs. A. Mayer,
Mrs. H. Marin.

Copies of this patent may be obtained for five cents each, by addressing the "Commissioner of Patents, Washington, D. C."